Sept. 17, 1968 G. CLOSE 3,401,879

NAVIGATIONAL COMPUTER

Filed May 14, 1965 4 Sheets-Sheet 1

INVENTOR.
GARTH CLOSE

BY

Woodhams, Blanchard and Flynn
ATTORNEYS

INVENTOR.
GARTH CLOSE
BY
Woodhams, Blanchard & Flynn
ATTORNEYS

Sept. 17, 1968 G. CLOSE 3,401,879

NAVIGATIONAL COMPUTER

Filed May 14, 1965 4 Sheets-Sheet 3

INVENTOR.
GARTH CLOSE

BY

Woodhams, Blanchard & Flynn

ATTORNEYS

INVENTOR.
GARTH CLOSE
BY
Woodhams, Blanchard and Flynn
ATTORNEYS 3,401,879
NAVIGATIONAL COMPUTER
Garth Close, 3215 29th St., Lubbock, Tex. 79410
Filed May 14, 1965, Ser. No. 455,774
2 Claims. (Cl. 235—61)

ABSTRACT OF THE DISCLOSURE

A small navigational computer having a substantially rigid support upon which an elastic band is mounted. A control device such as a manual reel with a brake is secured to one end of the support for engaging one end of the band, the other end of the band being anchored on the opposite end of the support. Operation of the control device permits the band to be stretched whereby visible speed, time and distance markings on the support and on the band permit the desired computation to be performed. The support may be foldable and when folded engage the brake.

This invention relates in general to a computer for use in solving navigational problems and, more particularly, to a small computer which can be easily held in one hand and which is particularly suited for solving problems involving combinations of speed, distance and time.

Many computers have been made and used to solve navigational problems, at least since the beginning of recorded history, because the science of navigation is undoubtedly one of the oldest. In spite of this fact, navigational computers, particularly for air navigation, have never been completely satisfactory. Those computers which are sufficiently complete to meet the requirements of accuracy have been either cumbersome or complex. Efforts have been made to avoid this problem by using a combination of several independent instruments. Thus, the existing computers have either been too clumsy for a pilot to manipulate while operating his aircraft, or a complete problem could not be solved without using two or more instruments.

For example, if pilot is navigating from a Sectional Aeronautical Chart or a World Aeronautical Chart, he must use some type of plotter including a protractor and a distance scale corresponding to the particular chart. The pilot must also have some type of computer for determining the time of arrival at check points based upon his air speed and the distance between check points. Insofar as I am aware, computers of the type currently used for performing the foregoing functions either do not include scales and a plotter, or they are not designed for use by the pilot while he is operating the aircraft. Moreover, most of these computers must be rotated or otherwise manipulated to take readings. During such turning, their settings can be accidentally disturbed without notice.

It is not surprising that existing computers for air navigation have not been developed to meet the specific needs. Large aircraft usually carry a navigator or copilot who is relatively free to operate the more complex computers. On the other hand, the lighter aircraft usually have only one pilot on board and no one else in the aircraft is capable of operating a complex computer. Also, the pilot of a light aircraft is not expected to travel distances of great length without carefully plotting and planning his trip in advance. However, the complete preparation of a flight plan before takeoff can often cause undesirable delays. Often, pilots become lost because they have decided to rely upon landmarks which do not materialize. Usually, they have realized this after they are enroute and frequently after it is too late for them to commence the use of their instruments which were not designed adequately for use in an emergency of this type. It is common knowledge among pilots that they have enough difficulty forcing themselves to rely entirely upon their instruments, where their position becomes doubtful, even when their instruments are adequate for the purposes. However, when the tools are inadequate, such reluctance often controls.

Accordingly, the objects of this invention have been to provide:

(1) A small, uncomplicated computer for solving navigational problems involving time, distance and speed, which computer can be operated so easily and effectively that there is no reason for a pilot to avoid its use, even though he has not prepared a flight plan, and there is no reason why he cannot commence the use of the computer as soon as he becomes air-borne.

(2) A computer, as aforesaid, which is light in weight which can be easily held in one hand, which can be easily and quickly adjusted for changes in ground speed, which can be used to measure distances directly from the navigational chart being followed, which is very easy to read, which can be read at all times without changing its position with respect to the reader, and which is adequately accurate for its intended purposes.

(3) A computer, as aforesaid, which can be manufactured inexpensively, which can be folded for compactness and ease of transporting, which can be adapted for use while navigating either at a relatively slow speed in a lightweight aircraft or at a relatively high speed in a commercial or military aircraft.

(4) A computer, as aforesaid, which can be easily adapted for combination with a wind vector analysis mechanism, and which can be handled by the pilot while he is flying an aircraft without distracting his attention in an unsafe manner from the operation of the aircraft.

Other objects and purposes of the invention will become apparent to persons familiar with instruments of this general type upon reading the following specification and examining the accompanying drawings, in which.

Figure 1:
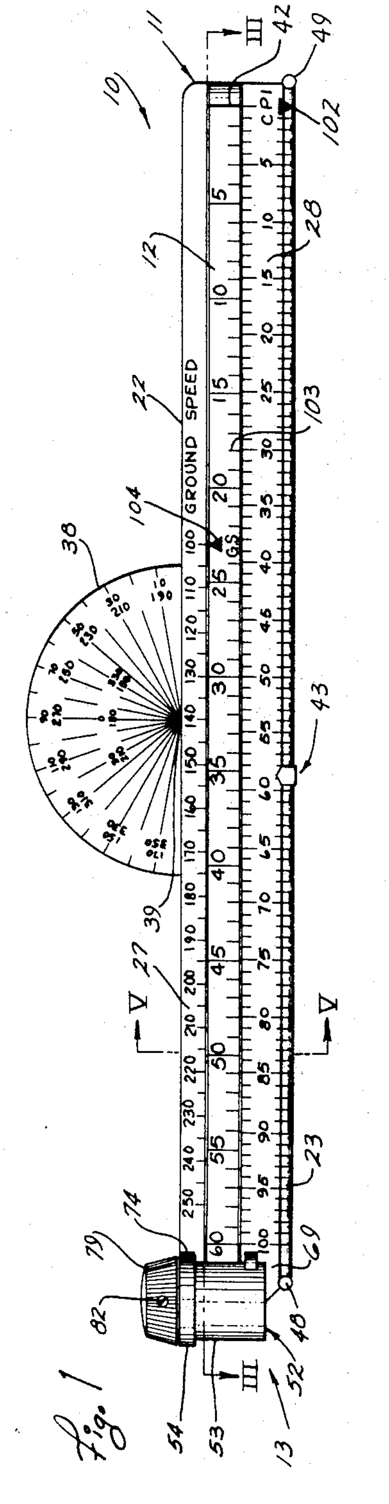
FIGURE 1 is a side elevational view of a computer embodying the invention.
Figure 18:
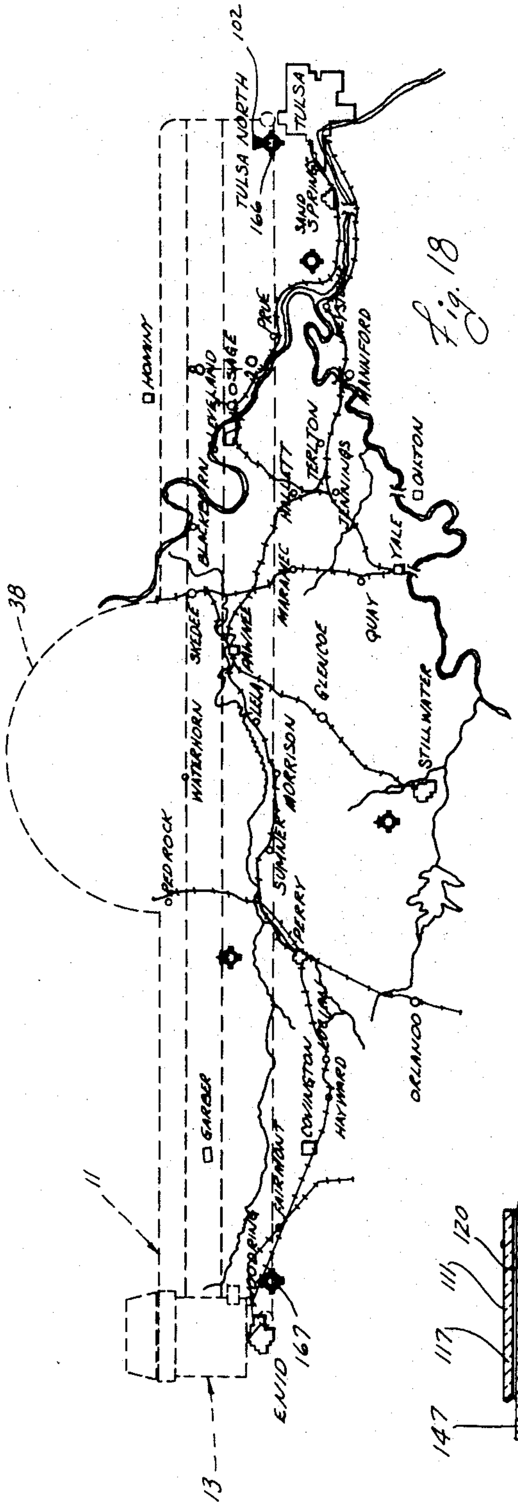

FIGURE 18 discloses a portion of the "Wichita Sectional Aeronautical Chart printed by the U.S. Department of Commerce, Coast and Geodetic Survey," with a broken line showing of the computer shown in FIGURE 1.

For convenience in description, the terms "upper," "lower" and words of similar import will have reference to the computer and parts thereof as appearing in FIGURES 1, 2, 7 and 9. The terms "inner," "outer" and derivatives thereof will have reference to the geometric center of said computer and/or parts thereof.

*General construction*

Figure 2:
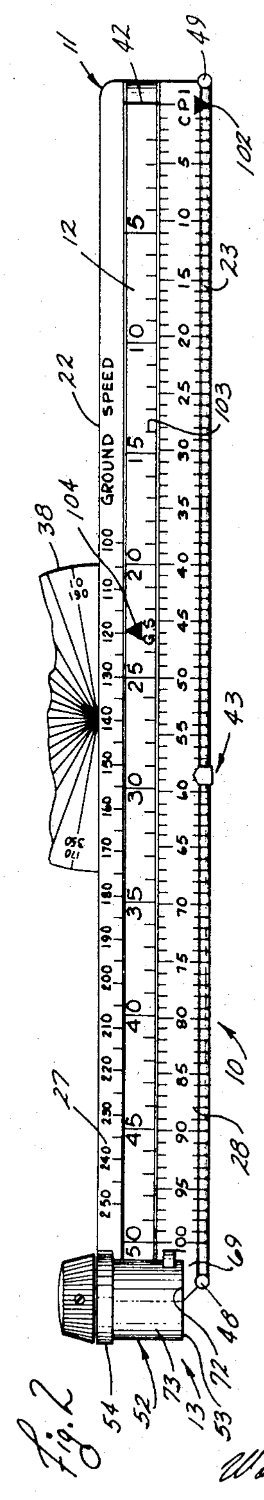
FIGURE 2 is a side elevational view of said computer with a part thereof in a different operational position.
Figure 7:
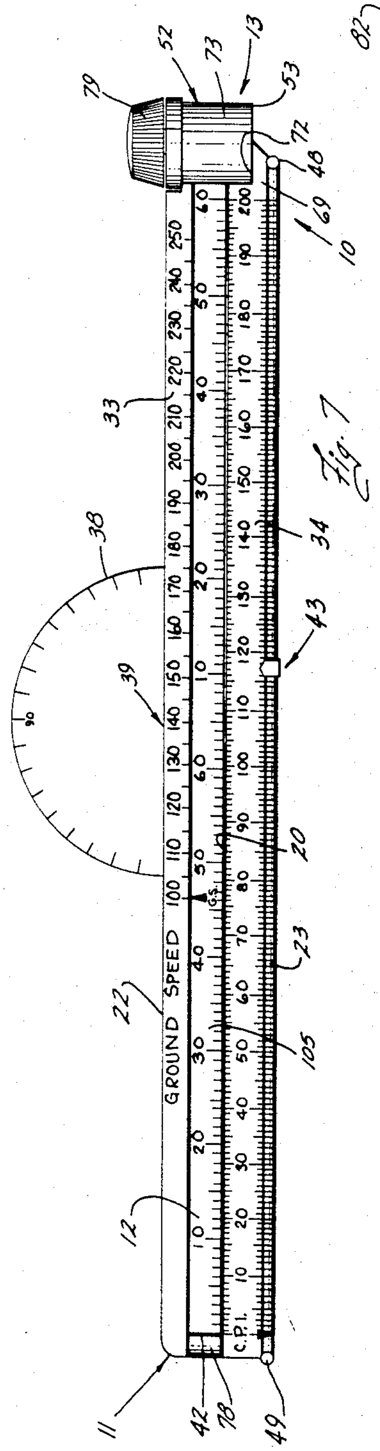
FIGURE 7 is a side elevational view of said computer as appearing from the reverse side thereof shown in FIGURES 1 and 2.
Figure 8:
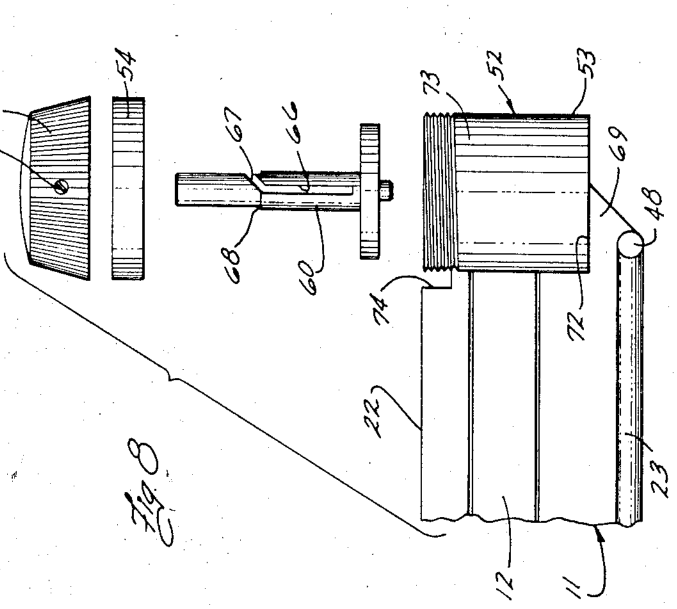
FIGURE 8 is an exploded, enlarged fragment of the structure appearing in FIGURE 7.

The objects and purposes of the invention, including those set forth above, have been met by providing an elongated computer 10, a preferred embodiment of which is illustrated in FIGURES 1, 2 and 7, having a substantially rigid scale supporting flat base member 11 upon which a resiliently stretchable element or band 12 is mounted. A control device 13 is secured to one end of the member 11 for engaging one end of the elastic band 12, the other end of which band is anchored on the opposite end of the support member 11. Thus, by operating the control device 13, the elastic band 12 can be stretched. A number of scales including a ground speed scale and a distance scale are visibly marked on the member 11, and a time scale is marked upon the elastic band 12.

In a modified structure, the scale supporting member 11 has two sections which are hingedly connected so that the member 11 can be folded to occupy less space. The computer may include a protractor.

*Detailed description*

Figure 5:
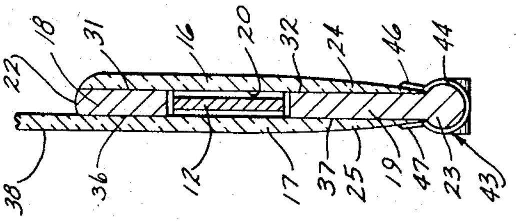
FIGURE 5 is a sectional view taken along the line V—V in FIGURE 1.

The scale supporting member 11 (FIGURE 1) is preferably, but not necessarily, fabricated from one or more types of plastic materials which are relatively rigid, but which are also sufficiently resiliently flexible that they can be bent, dropped or otherwise exposed to reasonably rough treatment without becoming fractured or permanently losing their shape. A preferred embodiment of the supporting member is comprised of a pair of preferably similar, substantially parallel face plates 16 and 17 which are preferably fabricated from a transparent plastic material. A pair of spaced, substantially parallel spacing bars 18 and 19, which are preferably of substantially the same thickness, are disposed between the upper and lower edge portions, respectively, of the face plates 16 and 17. The spacing bars 18 and 19 and the face plates 16 and 17 define therebetween a vertically elongated opening 20 (FIGURE 5) extending lengthwise through the member 11.

The upper edges of the face plates 16 and 17 and the upper spacing bar 18 are arranged to blend smoothly together to provide, in this embodiment, a rounded upper surface 22 for the supporting member 11. The lower edge portion 23 of the lower spacing bar 19 projects beyond the lower edges of the face plates 16 and 17 and may define approximately 270° of a cylinder which, for reasons hereinafter disclosed, has a diameter substantially larger than the thickness of the adjacent part of the spacing bar 19. The lower edge portions 24 and 25 of the face plates 16 and 17 are preferably tapered downwardly toward the edge portion 23 of the spacing bar 19 from points near the upper edge of said spacing bar.

The spacing bars 18 and 19 are preferably fabricated from a plastic which is not transparent, but may be translucent. Thus, the ground speed scale 27 (FIGURE 1) and distance scale 28 can be printed or otherwise marked on the front faces 31 and 32, respectively, of the spacing bars 18 and 19 where they are protected from damage during use by the face plate 16. Likewise, the ground speed scale 33 and distance scale 34 (FIGURE 7) can be printed or otherwise marked upon the rear faces 36 and 37, respectively, of the spacing bars 18 and 19 and thereby protect it from damage during use by the rear face plate 17. Since the spacing bars 18 and 19 are not transparent, the scales on one side of the scale supporting member 11 will not interfere with the reading of the scales on the opposite side of the member.

It will be apparent that the scale supporting member 11 can be fabricated in a variety of different ways without departing from the invention. For example, the supporting member can be extruded from plastic material, which can be transparent where the ground speed and distance scales will be located. In order to render the computer 10 complete for plotting as well as computing, the rear face plate 17, for example, is provided with an integral protractor 38 which may include both halves of a compass rose marked on one or both sides thereof. The center 39 of the protractor 38 is located along the upper edge surface 22 of the member 11 and indicia indicating angles in the range of from 0° to 180° and from 180° to 360° are provided along the arcuate edge of the protractor in a conventional manner.

The face plates 16 and 17 are notched between the spacing bars 18 and 19 (FIGURE 1) at one end of the supporting member 11 to provide a recess 42, which communicates with one end of the lengthwise opening 20. A slider 43, which has a circular portion 44 preferably extending through an arc of approximately 270°, snugly but slideably engages the lower edge portion 23 of the spacing bar 19 for movement lengthwise therealong. Said slider has a pair of pointers 46 and 47 integral with the arcuate portion and extending from the extremities thereof upwardly along and closely adjacent the lower edge portions 24 and 25 of the face plates 16 and 17. The slider 43 is preferably fabricated from a resiliently flexible material so that the points 46 and 47 can be spread apart to permit the mounting of the slider 43 upon the edge portion 23. Enlargements 48 and 49 (FIGURE 1) at the opposite ends of the edge portion 23 prevent the slider 43 from being accidentally removed from the ends of said edge portion 23.

Figure 6:
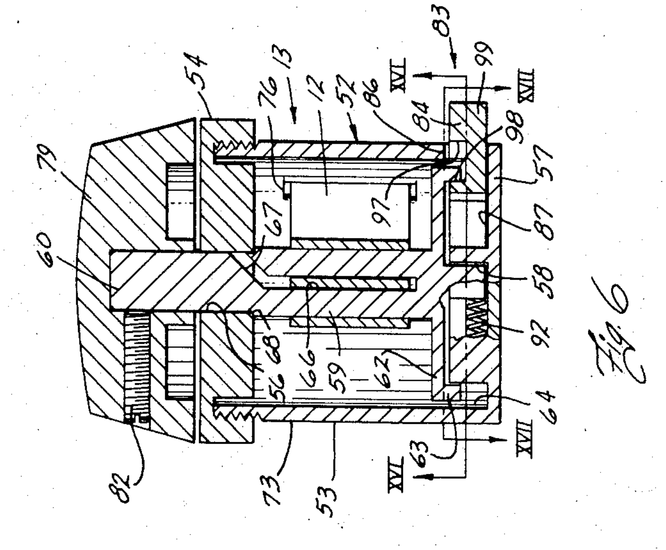
FIGURE 6 is a sectional view taken along the line VI—VI in FIGURE 3.

The control device 13 (FIGURE 6) includes a substantially cylindrical housing 52 having a cup 53 which is threaded near its upper end, in this embodiment, for threaded engagement by a cover 54. However, a snap fit or any other type of connection between the cup 53 and cover 54 would be acceptable. The cover 54 has a central opening 56 and the bottom wall 57 of the cup 53 has a central recess 58, said opening 56 and recess 58 being cylindrical and preferably coaxial with the cup 53. A takeup spindle 59 is rotatably supported within the central opening 56 and the recess 58 so that the upper end 60 of the spindle projects above the cover 54.

The spindle 59 has an integral, radially extending flange 62 with a downwardly projecting, peripheral edge portion 63. The bottom wall 57 is provided with an annular groove 64 into which the edge portion 63 projects. The spindle 59 also has a lengthwise slot 66 which extends completely and preferably diametrically through said spindle. The upper end 67 of the slot 66 extends transaxially outwardly through the spindle, preferably at a point opposing the side wall of the central opening 56 when the lower end of said spindle 59 is seated in the recess 58. The upper end portion 60 of the spindle 59 is preferably slightly reduced in diameter to provide a shoulder 68 adjacent the lower surface of the cover 58, whereby the spindle 59 is held in the cup 53 by the cover 54.

The cup 53 is rigidly secured to the end 69 of the scale supporting member 11 remote from the recess 42 therein. Preferably, the supporting member 11 is notched at 72 so that the lower parts of the spacing bar 19 and the face plates 16 and 17 extend under and partially along the bottom wall 57 of the cup 53. Most of the remainder of the end 69 of the member 11 snugly abuts and is secured to the cylindrical side wall 73 of the cup 53, and the upper edge surface 22 of the member 11 is approximately even with the upper surface of the cover 54 when it is in position upon the cup 53. A small notch 74 is provided in the end 69 of the member 11 adjacent the edge surface 22 to receive the adjacent edge of the cover 54 when it is placed on the cup 53.

Figure 3:
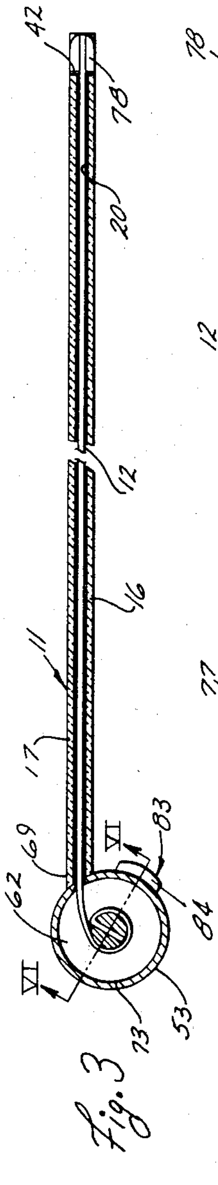
FIGURE 3 is a broken sectional view taken along the line III—III in FIGURE 1.

The face plates 16 and 17, hence the vertical extent of the supporting member 11, are preferably substantially parallel with the rotational axis of the spindle 59. The supporting member 11 is offset with respect to the axis of the cup 53 so that the central lengthwise axis of the opening 20 passes through the cup about halfway between the axis and the wall 73 of the cup, as clearly shown in FIGURE 3, for reasons which will appear hereinafter. A slot 76 is provided in the side wall 73 of the cup 53 in alignment and communication with the opening 20 in the member 11.

Figure 4:
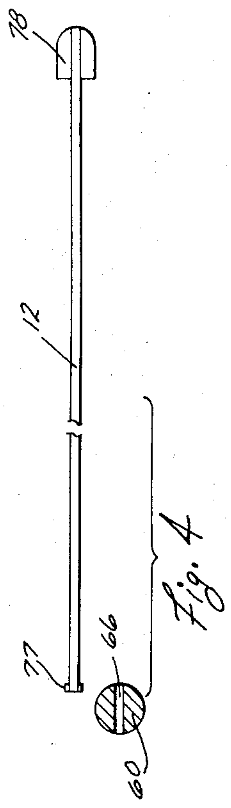
FIGURE 4 is an enlarged fragment of the structure appearing in FIGURE 3.

The resiliently stretchable element 12, which may be an elastic band, (FIGURE 3) extends lengthwise through the opening 20 and through the slot 76, and one end thereof is connected to the spindle 59. In this particular embodiment, as shown in FIGURE 4, the elastic band 12 has an enlargement 77, such as a metal or plastic clip, which is wider than the width of the slot 66 in the spindle 59. Accordingly, the end of the band 12 adjacent the enlargement 77 is inserted into the upper end 67 of the slot 66 where it is held against radial removal by the enlargement 77.

The other end of the band 12 (FIGURE 3) is connected to a manually engageable anchor 78 which is snugly but slideably receivable into the recess 42 in said member 11. Preferably, the front and rear surfaces of the clamp 78 are approximately coplanar with the outer surfaces of the face plates 16 and 17 so that the clamp does not interfere with the normal use and operation of the computer 10. When the spindle 59 is rotated in a counterclockwise direction as appearing in FIGURE 3, the elastic band 12 is wound upon the spindle 59 and, accordingly, stretched between the recess 42 and the spindle 59.

By locating the supporting member 11 and the slot 76 as described above (FIGURE 3), the central axis of the lengthwise opening 20 in the member 11 will normally be about tangent with the effective periphery of the spindle 59 when the band is about half wound thereon. This will minimize the amount of wear on the band 12 as it passes through the slot 76. Also, by arranging the member 11 off center of the cup 53, the amount of the cup and cover projecting beyond the rear face plate 17, to which the protractor 38 is connected, is minimized. Thus, the protractor 38 will be as close to the surface of a chart being plotted thereby as is reasonably necessary to minimize the possibility of error.

A manually engageable knob 79 is secured, as by means of a set screw 82, to the upper end 60 of the spindle 59 for the purpose of rotating said spindle in a conventional manner.

Figure 16:
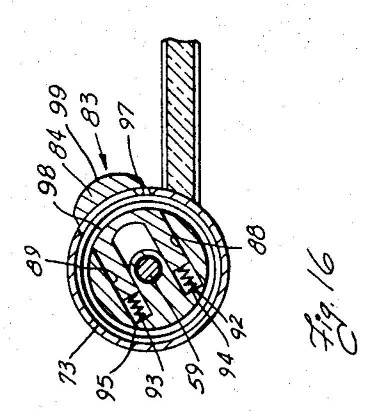
FIGURE 16 is a sectional view taken along the line XVI—XVI in FIGURE 6.

A brake mechanism 83 may be provided in the control device 13 for the purpose of releasably holding the spindle 59 in any given position. As shown in FIGURE 16, the brake mechanism 83 comprises a substantially U-shaped brake member 84 which projects through an opening 86 in the side wall 73 of the cup 53 adjacent the bottom wall 57. Said bottom wall is provided with a U-shaped slot 87 into which the legs 88 and 89 (FIGURE 16) are slideably received. A pair of springs 92 and 93 are disposed within the closed ends 94 and 95 of the slot 87 and engage the adjacent ends of the legs 88 and 89, respectively whereby the brake member 84 is continuously urged radially outwardly of the cup 53.

Figure 17:
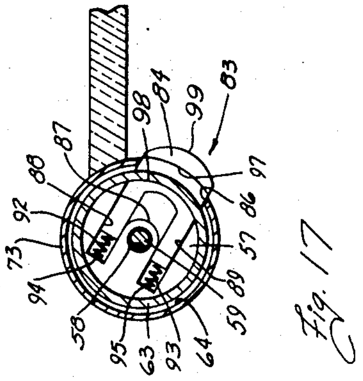
FIGURE 17 is a sectional view taken along the line XVII—XVII in FIGURE 6.
Figure 15:
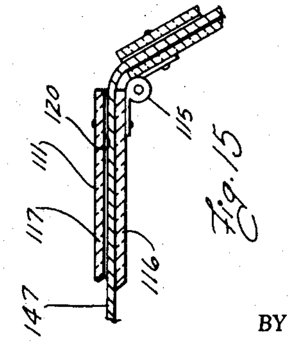
FIGURE 15 is a sectional view substantially as taken along the line XV—XV in FIGURE 9 with the computer in its partially folded condition.

The brake member 84 (FIGURES 6 and 17) has an arcuate groove 97 extending transversely of its upper surface into which the downwardly projecting peripheral edge portion 63 on the flange 62 is received. The radially inner wall 98 of the groove 97 is urged snugly against the edge portion 63 by the springs 92 and 93, whereby movement of the edge portion 63, hence rotation of the spindle 59, is frictionally opposed. However, as will be seen in FIGURES 6 and 17, movement of the brake member 84 radially inwardly of the cup 53, as by manually engaging the outer end 99 thereof, will disengage the brake member from the flange edge 63 and thereby permit the spindle 59 to rotate without interference from the brake mechanism 83. In this embodiment, the spindle 59 is preferably assembled so that the tension created by the band 12, when it is stretched and wound upon the spindle, will be sufficient to unwind the band from the spindle when the brake mechanism is released. While one brake mechanism has been disclosed, others are contemplated.

In this embodiment, the distance scale 34 is comprised of uniformly spaced units of distance corresponding to the units of distance on a Sectional Aeronautical Chart of the type compiled and printed by the United States Department of Commerce, Coast and Geodetic Survey, and the units are arranged to read in statute miles. The marker 102 (FIGURES 1 and 2), which is identified as CP1 (meaning control point 1), is provided for convenience in positioning the initial point of the distance scale on the first control point of the flight when using the computer.

The elastic band 12 carries on the front side thereof a time scale 103 which is comprised of uniformly spaced markings amounting to 60 minutes. When the band is straight, but substantially unstretched, the scale 103 extends over the same lengthwise distance as the 100 statute miles on the distance scale 28. Thus, the computer 10 disclosed herein is designed for a relatively light aircraft which will normally cruise at an air speed of between 120 and 170 miles per hour. Thus, if the aircraft encounters a strong head wind, so that the ground speed is reduced to something approaching, but in excess of, 100 miles per hour, this computer can still be used. Since the unstretched condition of the band 12 places the 60 minute mark directly above 100 miles, the ground speed marker 104 on the band 12 points at a ground speed of 100 miles per hour on the ground speed scale 27 when said band is in its unstretched condition.

The location of the ground speed marker 104, hence the 100 mile per hour mark on the ground speed scale, may be varied lengthwise of the supporting member 11. Normally, their location will depend upon the capacity of the elastic band 12 to be stretched without exceeding its elastic limit and the type of aircraft for which the computer is designed. That is, with an aircraft having an average cruising speed of approximately 180 miles per hour and a service ceiling of 10,000 feet, it is possible to encounter head winds which will slow the aircraft down to 130 miles per hour or tail winds which will increase its ground speed to 230 miles per hour. Also, it is easily possible for a light aircraft to encounter head winds of 30 miles per hour and a relatively high speed aircraft to encounter both head winds and tail winds of much greater magnitude. The computer shown in FIGURES 1 and 2 includes a ground speed scale which can be used by any aircraft under substantially normal flying conditions having a normal cruising speed of from approximately 130 miles per hour to approximately 200 miles per hour.

In determining the precise location of the ground speed marker 104, to obtain maximum utilization of this computer, the elastic band 12 is theoretically, at least stretched to its maximum length and the ground speed marker placed thereon as close to the end 69 of the member 11 as possible. This will then represent the maximum ground speed. By noting the relationship between the time scale 103 and the distance scale 28, when the band 12 is thusly stretched, the maximum ground speed can now be marked on the ground speed scale 27 opposite the marker 104. The band is then permitted to return to its straight and unstretched position wherein the 60 minute mark is again opposite the 100 mile mark on the distance scale. The 100 mile per hour mark is then placed upon the ground speed scale opposite the new location of the ground speed marker. The space between the highest ground speed mark and the 100 mile per hour ground speed marker is now marked off in uniform intervals corresponding to establish increments of speeds therebetween, such as 110 miles per hour, 120 miles per hour, 130 miles per hour and so forth.

In this embodiment, the elastic band 12 has a stretchability of approximately two and one-half times its unstretched length. It will be apparent that, by employing an elastic material having a greater stretchability, such as three or four times its unstretched length, a greater range of ground speeds can be provided with a distance scale 28 of the same length as shown on the computer 10.

The distance scale 34 of the rear side of the computer 10 is especially designed for use with a World Aeronautical Chart in which the distance scale is one-half the scale of a Sectional Aeronautical Chart. That is, one mile equals 500,000 miles on a sectional chart, and one mile equals 1,000,000 miles on a World Aeronautical Chart. Accordingly the distance scale 34 is divided into increments which can be used with a World Aeronautical Chart to compute speeds and times along a flight path which is up to 200 miles long, without changing the initial control point. However, since both sides of the computer of this embodiment would be used with both charts for the same type of aircraft, the length of the time scale 105 on the rear side of the band 12 is, therefore, just half as long as the time scale 103, which permits 120 minutes or two hours of time thereon in its unstretched position. Nevertheless, the ground speed scale will remain the same as on the front side of the computer, because the 60 minute mark on the band 12 will continue to be directly opposite the 100 mile mark when the band is in its substantially unstretched condition.

*Modified structure*

The advantage of a computer which is sufficiently small and compact to carry in an average shirt pocket or coat pocket is obvious. The computer described hereinabove may be approximately 13 inches long and one and one-quarter inches wide. Thus, while such computer is not so large as to be cumbersome or inconvenient to handle and carry, the applicant has conceived a modified computer 110 (FIGURE 9) which can be folded approximately midway between the ends thereof whereby its length is reduced approximately 50% without increasing its width and with an immaterial increase in thickness, only when it is folded.

More specifically, the modified computer 110 has a scale supporting member 111 which, in general, may be substantially identical with the scale supporting member 11, except that the member 111 is divided into first and second sections 112 and 113, respectively, which are pivotally connected to each other at their adjacent ends by the hinges 114 and 115. The scale supporting member (FIGURE 13) is comprised of a front face plate 116, a rear face plate 117, an upper spacing bar 118 and a lower spacing bar 119 which defines a vertically elongated opening 120 which extends lengthwise through the supporting member 111. The face plates 116 and 117 and the spacing bars 118 and 119 may, as indicated by a comparison of FIGURES 1 and 9, and of FIGURES 5 and 13, respectively, be substantially identical in all respects except those specifically discussed hereinafter. Thus, the supporting member 111 has a ground speed scale 123 and a distance scale 124 on its front side (FIGURE 9) and it has a ground speed scale 126 and distance scale 127 on its rear side (FIGURE 10), which may be identical with the scales on the member 11. Also, a slider 128 is mounted upon the lower edge 129 of the spacing bar 119 for movement lengthwise thereof.

Figure 13:
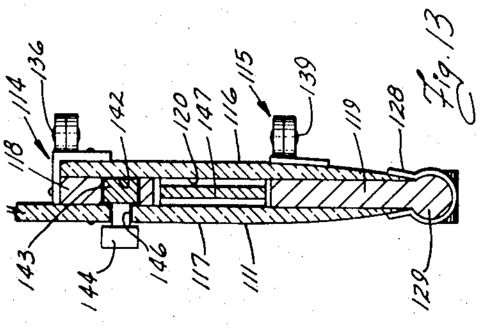
FIGURE 13 is a sectionaal view taken along the line XIII—XIII in FIGURE 9.

The upper hinge 114 (FIGURE 9) has a pair of L-shaped hinge plates 132 and 133 which embrace the front face plate 116 and the upper edge 134 of the scale supporting member 111. The hinge plates 132 and 133 are interconnected by a hinge pin 136 (FIGURE 13). The lower hinge 115 has hinge plates 137 and 138 which are connected to the face plate 116 and a hinge pin 139. The hinge pins 136 and 139 are coaxial for obvious reasons.

Figure 9:
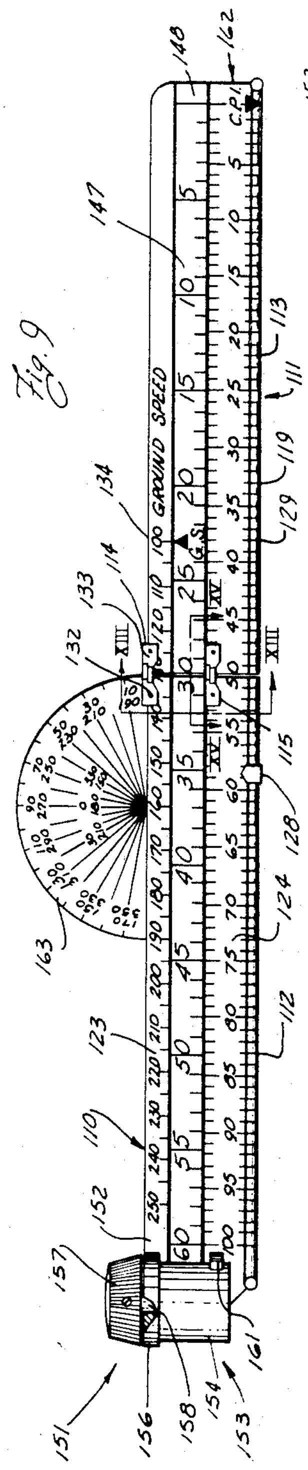
FIGURE 9 is a side elevational view, similar to that shown in FIGURE 1, disclosing a modified computer embodying the invention.
Figure 10:
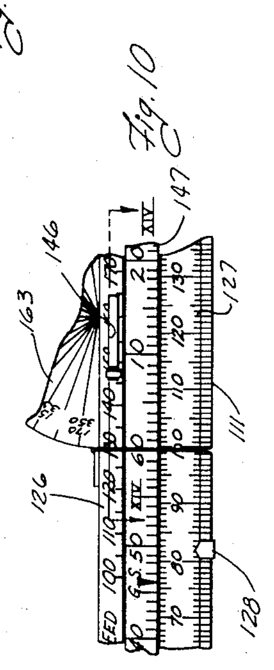
FIGURE 10 is a fragment of the reverse side of the modified computer shown in FIGURE 9 near the center thereof.
Figure 14:
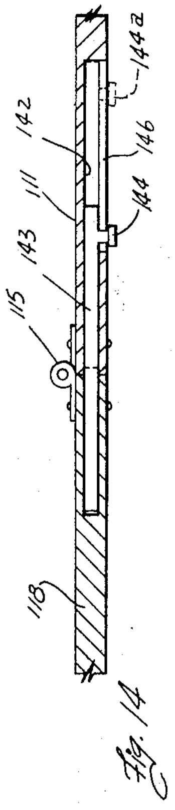
FIGURE 14 is a sectional view taken along the line XIV—XIV in FIGURE 10.

Under normal operating conditions, it will be desirable to have the sections 112 and 113 held against accidental pivotal movement away from their outstretched, or unfolded positions of FIGURE 9. Accordingly, the upper spacing bar 118 is provided with an elongated slot 142 which extends into the adjacent ends of both sections 112 and 113 (FIGURE 14). A lock bar 143 is slidably disposed within the slot 142 which, in this embodiment, extends into the section 112 somewhat further than it does into the section 113 so that said lock bar 143 can be fully retracted into an unlocking position within the section 112. The lock bar has a sidewardly extending finger 144 which projects through an elongated slot 146 in the rear face plate 117, said slot 146 being parallel with and communicating with the slot 142. The finger 144 extends beyond the face plate 117 so that it can be manually engaged for shifting the lock bar 143 from its solid line locking position of FIGURE 14 into its broken line retracted posiiton 144A, where it does not interfere with the folding of the sections 112 and 113 upon each other.

The modified computer 110 includes an elongated, resiliently stretchable element or elastic band 147 which is engaged at its one end by a clamp 148 (FIGURE 9), which anchors that end of the band against movement toward the control device 151 secured to the opposite end 152 of the scale supporting member 111. The control device 151 (FIGURES 9 and 11) is preferably identical with the control device 13 (FIGURE 6) of the computer 10. Thus, said control device 151 includes a housing 153, having a cup 154 and a cover 156, and also includes a manually engageable control knob 157 and a spindle 158 which may be identical with the corresponding parts in the device 13. The end of the elastic band 147, remote from the clamp 148, may be attached to the spindle 158 in exactly the same manner as the elastic band 12 is secured to the spindle 59.

Figure 11:
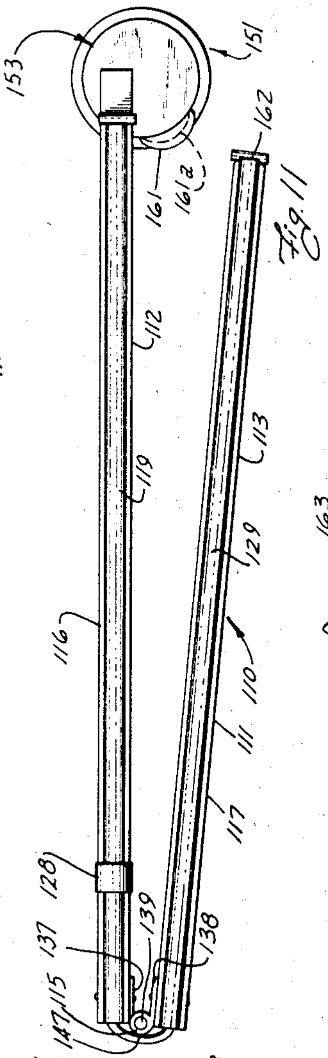
FIGURE 11 is a bottom view of said modified computer as it appears in the substantially folded position.
Figure 12:
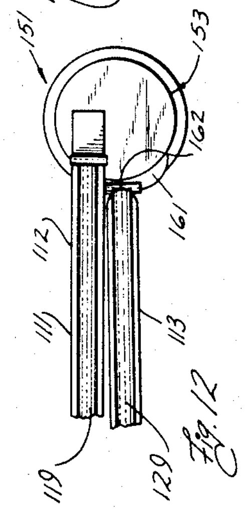
FIGURE 12 is a fragment of the computer disclosed in FIGURE 11 when it is in its fully folded position.

The control device 151 includes a brake mechanism which may be identical with the brake mechanism 83 of the computer 10 and which includes a brake operating member 161, which is resiliently urged radially outwardly of the cup 154 into its solid line position of FIGURE 11. The lengths of the sections 112 and 113 are selected and the axis of the hinges 114 and 115 is located so that the free end 162 will move the brake member 161 into its broken line position 161A (FIGURE 11) while the section 113 is being moved from its FIGURE 12 position into its FIGURE 11 position, whereby the brake member 161 will serve to yieldably and resiliently hold the section 113 in its folded position of FIGURE 12.

In other words, in order to fold the section 113 upon the section 112, it is necessary to move the brake member 161 radially inwardly of the cup 53, whereby the spindle 158 is released for rotation by the elastic band 147 if said band is wound upon the spindle and, therefore, under tension. This tends to increase the useful life of the band 147 by automatically releasing the tension thereon each time the computer is folded.

The band 147 may be fabricated from a variety of materials capable of being stretched repeatedly and extensively without fatiguing or becoming permanently incapable of returning to their original shape or length. For example, the band 147, as well as the band 12, could be fabricated from some of the newer synthetic fabrics which have inherent elasticity and, moreover, which can be woven in a manner to augment this inherent elasticity, thereby greatly increasing their capacity to be stretched without exceeding their elastic limits.

A protractor 163 (FIGURES 9, 10 and 13), which may be substantially identical with the protractor 38 (FIGURE 1), is preferably integral and coplanar with that portion of the rear face plate 117 which is a part of the section 112. Said protractor 163 preferably projects from the upper edge of the scale supporting member 111 adjacent the hinge 114 in order to place said protractor relatively close to the center of the computer 110.

*Operation*

In order to illustrate the use of the computer 10, for example, in navigating a flight, specific reference will be made hereinafter to a flight from Tulsa, Oklahoma, to Enid, Oklahoma, as shown in FIGURE 18. That is, the computer 10 is placed upon that portion of the aeronautical chart which discloses the Tulsa North airport 166 and the Enid airport 167. On a Sectional Aeronautical Chart, these two airports come within the full length of the distance scale 28 on the front side of the scale supporting member 11. The pilot will note that it is very close to 100 miles from the Tulsa North airport to the Enid airport. Thus, if his normal cruising speed is 120 miles per hour, for example, he should reach Enid in about 50 minutes, providing there is no substantial amount of wind and he flies fairly close to the ground. However, the pilot knows that there is almost always some air movement at cruising altitude and that ground speed increases with altitude, even though a substantially constant air speed is maintained. Accordingly, the pilot may, if he wishes to minimize error, circle the airport 166, after he takes off, and pass over the field substantially at his crusing altitude and on a true course toward Enid.

While the pilot is circling the airport 166, he can turn the knob 79 so that the ground speed marker 104 is set at 120 miles per hour. The pilot can check his course, if he has not been able to obtain detailed information about the wind direction and velocity of his cruising altitude, by checking his position with respect to the railroad track and Arkansas River (FIGURE 18) as he approaches the small town of Prue. At a cruising altitude of 3,000 feet, for example, the pilot should easily be able to see the river and the railroad track on his left before he is out of sight of the Tulsa North airport and, therefore, be able to begin correction of his course as may be required due to any cross wind.

At the time that the pilot departs Tulsa North airport 166, he will note his time in minutes. Since Osage is just to the right of the flight line, it may be selected as the first check point. It should be reasonably easy to identify because it is at the center of three outgoing railroad tracks and close to a bridge crossing the Arkansas River. When the pilot is directly abeam of Osage, which is 23 miles from airport 166, he will note the time and, if he has been encountering no substantial amount of wind, he should arrive at Osage in about 11 minutes. If so, no change is required in the setting of the computer. However, if he reaches Osage in ten minutes, he will turn the control knob 79 on the control device 13 until the ten minute mark on the time scale 103 is directly opposite the 23 mile mark on the distance scale 28. Then, by referring to the ground speed marker 104 and the ground speed scale 27, the pilot will observe that he has been maintaining a ground speed of about 133 miles per hour. Accordingly, if he maintains his present course and his present air speed, he should reach Enid approximately 45 minutes from the time that he departed Tulsa North airport.

It will be noted that Perry is about two miles south of the flight line between Tulsa and Enid so that it will provide a further check point which the pilot should reach in approximately 32 minutes from the time of his departure. If a substantial change in wind velocity and/or direction is encountered between Osage and Perry, the necessary correction can be made by rotating the knob 79 until the appropriate minute mark on the time scale 103 is aligned with the 70 mile marker on the distance scale 28. However, under normal circumstances, where visual flight regulations are in effect, the wind direction and velocity during a 45 minute period within an area of not more than 100 miles will not change materially.

It follows, therefore, that if the pilot wishes to pinpoint his position during flight, he will note the time that has elapsed since his departure from check point 1, and then note the distance opposite the number of minutes that have elapsed. If, for example, he has traveled for 20 minutes, then he should be directly south of Pawnee.

Where the pilot is using a World Aeronautical Chart, the ground speed scale 33, the distance scale 34 and the time scale 105 on the reverse side of the computer 10 will be utilized in substantially the same manner as set forth above with respect to the scales on the front side of the computer.

Although a particular preferred embodiment of the invention has been described above for illustrative purposes, it will be recognized that variations or modifications of such disclosure, which come within the scope of the appended claims, are fully contemplated.

The embodiments of the invention in which an exclusive property or privilege is claimed are defined as follows:

1. A navigational computer, comprising:

an elongated, substantially flat base member having an opening therein extending lengthwise thereof;

an elongated, resiliently stretchable band disposed within said opening and extending lengthwise thereof;

means at one end of said band releasably engageable with one end of said member for preventing movement of said one end of said band toward the other end of said member;

a substantially cylindrical, cup-shaped housing means rigidly secured to the other end of said member;

shaft means rotatably mounted upon said member near the other end thereof and transversely of said opening for engagement with the other end of said band, said shaft means being concentrically and rotatably disposed within said housing means;

cover means removably secured to the open end of said housing means and having a central opening through which said shaft means extends;

a control knob removably secured to the extended end of said shaft means for manually rotating said shaft means for wrapping a portion of said band thereon whereby the remainder of said band is stretched;

said shaft means being removable from said housing means and having a radially extending flange means with a peripheral edge portion projecting axially of said shaft means;

said housing means having a radially disposed opening in the sidewall thereof adjacent said peripheral edge portion;

a manually engageable plunger extending radially through said radial opening in said sidewall for engagement with said peripheral edge portion;

resilient means in said housing means urging said plunger against said peripheral edge portion whereby rotation of said shaft is substantially impeded;

first and second sets of visible marks located on said member, the marks in each set being disposed at predetermined, spaced intervals lengthwise along said member and near said opening; and a third set of visible marks located on said band at predetermined, spaced intervals lengthwise thereof, the intervals in said three sets being related, and the spacing between the marks in the third set being increased proportionately when said band is stretched.

2. A computer according to claim 1, wherein:

said base member is divided into two sections of substantially equal lengths hingedly connected together approximately midway between the ends of said member, whereby one section can be folded against the other;

said plunger being positioned so that it is depressed by said one section, against the contrary urging of said resilient means, as said sections are moved into and out of their folded positions.

References Cited

UNITED STATES PATENTS

| | | | |
|---|---|---|---|
| 101,411 | 4/1870 | Bache | 33—137 |
| 111,327 | 1/1871 | Dillingham | 33—138 X |
| 652,814 | 7/1900 | Setzer | 33—138 X |
| 1,161,358 | 11/1915 | Stotler et al. | 33—74 |
| 1,870,655 | 8/1932 | Schur | 33—107 X |
| 2,256,116 | 9/1941 | Hughes | 33—137 X |
| 2,390,622 | 12/1945 | Stanton | 33—75 |
| 2,452,241 | 10/1948 | Jantzen | 33—141 |
| 2,916,203 | 12/1959 | Griffiths | 33—107 X |
| 1,535,917 | 4/1925 | Harsin | 33—105 |

FOREIGN PATENTS

| | | |
|---|---|---|
| 508,923 | 7/1939 | Great Britain. |
| 22,101 | 9/1897 | Great Britain. |

ROBERT B. HULL, *Primary Examiner.*